(12) United States Patent
Winkler et al.

(10) Patent No.: US 7,636,619 B2
(45) Date of Patent: Dec. 22, 2009

(54) DEVICE FOR AIDING THE GUIDANCE OF A FOLLOWER AIRCRAFT FORMING PART OF A PATROL, AS WELL AS A SYSTEM FOR AIDING A PATROL FLIGHT COMPRISING SUCH A DEVICE

(75) Inventors: Falk Winkler, Cintegabelle (FR); Guillaume Fouet, Toulouse (FR); Didier Menras, Toulouse (FR)

(73) Assignee: Airbus France, Toulouse (FR)

( * ) Notice: Subject to any disclaimer, the term of this patent is extended or adjusted under 35 U.S.C. 154(b) by 162 days.

(21) Appl. No.: 11/680,281

(22) Filed: Feb. 28, 2007

(65) Prior Publication Data

US 2008/0039987 A1    Feb. 14, 2008

(30) Foreign Application Priority Data

Feb. 28, 2006    (FR)    ................................. 06 01716

(51) Int. Cl.
*G05D 1/02* (2006.01)
*G06F 7/70* (2006.01)

(52) U.S. Cl. .............................. 701/14; 701/4; 701/121; 701/122; 701/301; 342/30; 342/450; 340/992

(58) Field of Classification Search ..................... 701/3, 701/4, 7, 300, 301; 343/705, 961; 342/29, 342/30, 104, 175, 182

See application file for complete search history.

(56) References Cited

U.S. PATENT DOCUMENTS

| | | | | |
|---|---|---|---|---|
| 3,153,232 | A * | 10/1964 | Fletcher et al. | ................ 342/29 |
| 3,573,818 | A * | 4/1971 | Lennon et al. | ................ 342/29 |
| 5,043,903 | A * | 8/1991 | Constant | ..................... 701/300 |
| 6,459,411 | B2 * | 10/2002 | Frazier et al. | ................ 342/455 |
| 6,587,757 | B2 * | 7/2003 | Sainthuile | ....................... 701/1 |
| 6,718,236 | B1 * | 4/2004 | Hammer et al. | ................ 701/3 |
| 7,272,472 | B1 * | 9/2007 | McElreath | ..................... 701/3 |
| 2005/0165516 | A1 | 7/2005 | Haissig et al. | |
| 2007/0132638 | A1 * | 6/2007 | Frazier et al. | ................ 342/455 |
| 2007/0233337 | A1 * | 10/2007 | Plishner | ....................... 701/23 |

FOREIGN PATENT DOCUMENTS

FR    2632755    12/1989

OTHER PUBLICATIONS

Preliminary Search Report dated Oct. 27, 2007.

* cited by examiner

*Primary Examiner*—Thomas G Black
*Assistant Examiner*—Lin B Olsen
(74) *Attorney, Agent, or Firm*—Dickinson Wright PLLC

(57) ABSTRACT

A device for aiding the guidance of a follower aircraft forming part of a patrol, as well as a system for aiding a patrol flight employing such a device has a calculation unit for determining: (1) a first flight trajectory allowing a follower aircraft to follow a main lead aircraft in accordance with a main patrol configuration and (2) a second flight trajectory allowing the follower aircraft to follow an auxiliary lead aircraft in accordance with an auxiliary patrol configuration.

12 Claims, 3 Drawing Sheets

DEVICE FOR AIDING THE GUIDANCE OF A FOLLOWER AIRCRAFT FORMING PART OF A PATROL, AS WELL AS A SYSTEM FOR AIDING A PATROL FLIGHT COMPRISING SUCH A DEVICE

BACKGROUND OF THE INVENTION

The present invention relates to a device for aiding the guidance of a follower aircraft, said device being mounted on said follower aircraft and allowing the latter to follow a lead aircraft during a patrol flight, as well as to a system for aiding a patrol flight comprising at least one such device.

DESCRIPTION OF THE PRIOR ART

It is known that a patrol (or formation) of aircraft, for example of fighters, is composed of a lead aircraft, also called the leader, which is followed in flight according to a particular spacing (defined vertically, longitudinally and laterally) by one or more follower aircraft, also called wingmen. The relative flight between the lead aircraft and a follower aircraft may be performed:

either simply (and exclusively) on the basis of the judgment of the pilot of the follower aircraft, as a function of his direct vision of the lead aircraft;

or by way of a system of information and/or of aid to piloting, such as an electronic system for aiding a patrol flight.

In this second case, the fact of being within visual range is no longer a required criterion for operating in formation. The follower aircraft can therefore follow a leader which is not necessarily the aircraft which precedes it at short distance. In particular, it can follow a leader at long distance or under very unfavorable meteorological conditions, in particular during reduced visibility, for example at night or during significant precipitations.

Now, for a patrol flight, there is always a risk of sudden disappearance of the leader, for example by exit from the formation (fault, cancellation of the mission) or by crash (artillery or ground-to-air missile for example). The loss of the guidance information emanating from the leader is particularly critical during the presence of unfavorable meteorological conditions and for small longitudinal gaps between the various follower aircraft (this representing a very frequent operational case), especially on account of the risk of collision then existing between the various follower aircraft.

This is why a standard system for aiding a patrol flight, of the aforesaid type, which does not provide any solution for alleviating a possible disappearance of the lead aircraft (or leader) of the control, is not entirely satisfactory, especially for safety reasons.

SUMMARY OF THE INVENTION

The present invention relates to a device for aiding the guidance of a follower aircraft forming part of a patrol, which makes it possible to remedy the aforesaid drawbacks.

For this purpose, according to the invention, said device which is mounted on said follower aircraft and which allows said follower aircraft to follow a main lead aircraft during a patrol flight, this device comprising:

first means for producing first position deviations (longitudinal, lateral and vertical) between the follower aircraft and the main lead aircraft;

a calculation unit for determining, as a function of a predetermined main patrol configuration and of said first position deviations, a first trajectory which corresponds to a flight trajectory allowing the follower aircraft to follow said main lead aircraft in accordance with said main patrol configuration; and guidance means which receive said first trajectory determined by said calculation unit and which are formed in such a way as to aid the guidance of the follower aircraft along said trajectory received, is noteworthy in that:

said device moreover comprises:

second means for producing second position deviations (longitudinal, lateral and vertical) between the follower aircraft and a predetermined auxiliary lead aircraft;

recording means for recording said second position deviations and the trajectory of said auxiliary lead aircraft; and a control means which is able to be actuated by a pilot of said follower aircraft and which is formed in such a way as to control the transmission of said second position deviations to said calculation unit when said control means is actuated; and said calculation unit is formed in such a way as:

to calculate, upon actuation of said actuation means, as a function of said second position deviations received, of said trajectory of said auxiliary lead aircraft and of an auxiliary patrol configuration, a second trajectory which corresponds to a flight trajectory allowing the follower aircraft to follow the auxiliary lead aircraft in accordance with said auxiliary patrol configuration; and to transmit this second trajectory to said guidance means, in place of said first trajectory.

Thus, by virtue of the invention, an auxiliary lead aircraft (or replacement leader) is envisaged in advance (generally during mission preparation), which is intended to replace the main lead aircraft (or main leader) if this turns out to be necessary in the course of the mission. Moreover, by virtue of the invention, such a replacement is implemented automatically upon actuation of said control means by the pilot of the follower aircraft.

So, upon the disappearance of the current leader (main lead aircraft), the pilot of the follower aircraft can actuate said control means so that the device in accordance with the invention then takes into account the position of the replacement leader (auxiliary lead aircraft) which is henceforth followed by the follower aircraft in accordance with the predetermined auxiliary patrol configuration.

Consequently, within the framework of the present invention, a patrol configuration (or formation configuration) is defined with respect to the current leader and a patrol configuration (or formation configuration) is defined with respect to the replacement leader, and said device is able to take into account the latter configuration as current configuration at any moment, simply on a decision of the pilot of the follower aircraft (without this pilot being compelled to carry out an in-depth analysis of the situation which is often tricky). The expression "patrol configuration" is understood to mean the position and the deviations (lateral, longitudinal, vertical) within the patrol, between the one or more follower aircraft and the leader of the patrol.

Additionally, as the device in accordance with the invention records continuously, by way of said recording means, said second position deviations (that is to say the longitudinal, lateral and vertical deviations with respect to the auxiliary lead aircraft), the values used by the calculation unit upon actuation of the control means represent the current actual deviations, thereby eliminating any risk of deviation of the follower aircraft for attaining its new reference position in the formation and avoiding the need for the auxiliary lead aircraft to have to previously attain the position that the main lead aircraft occupied before its disappearance.

Consequently, the device in accordance with the invention makes it possible to anticipate a disappearance of the main lead aircraft, that is to say of the current leader.

It will be noted that the guidance means of the device in accordance with the invention may comprise means, such as a flight director for example, which are intended to give the pilot of the follower aircraft indications in such a way as to allow him to manually make the latter follow the trajectory received from the calculation unit. However, in a preferred embodiment, said guidance means comprise automatic piloting means which carry out automatically (in standard fashion) the guidance of the follower aircraft along the trajectory received. In this case, the pilot can devote himself entirely (and in complete safety) to other tasks, such as the observation of his aerial environment or of the terrain overflown for example.

In a first embodiment, said first means comprise a first positioning element which measures the relative positioning between the main lead aircraft and the follower aircraft in such a way as to produce said first position deviations.

Furthermore, in a second embodiment, said first means comprise:
  a second positioning element which measures the effective (geographic) position of the follower aircraft; and
  a first element for receiving data which is formed in such a way as to receive the effective (geographic) position of the main lead aircraft, said effective (geographic) positions of said follower aircraft and of said main lead aircraft making it possible to form said first position deviations.

Additionally, in a first variant embodiment, said second means comprise a third positioning element which measures the relative positioning between the auxiliary lead aircraft and the follower aircraft in such a way as to produce said second position deviations.

Moreover, in a second variant embodiment, said second means comprise:
  a fourth positioning element which measures the effective (geographic) position of the follower aircraft; and
  a second element for receiving data which is formed in such a way as to receive the effective (geographic) position of the auxiliary lead aircraft, said effective (geographic) positions of said follower aircraft and of said auxiliary lead aircraft making it possible to form said second position deviations.

In a particular embodiment, the device in accordance with the invention moreover comprises display means able to present, on at least one viewing screen, values illustrating said second position deviations recorded, as well as optionally values illustrating said first position deviations. Thus, the pilot of the follower aircraft can be aware at any moment of his position with respect to the main lead aircraft (main leader), as well as with respect to the auxiliary lead aircraft (replacement leader), even if the latter is not the current leader.

It will be recalled that the taking into account in accordance with the invention of an auxiliary lead aircraft, which becomes main lead aircraft in case of failure of the main lead aircraft, makes it possible to decrease the reaction time and the duration of the loss of information pertaining to the trajectory to be followed.

The present invention also relates to a system for aiding a patrol flight, said patrol comprising a main lead aircraft, an auxiliary lead aircraft and at least one follower aircraft.

According to the invention, said system is noteworthy in that it comprises at least one device such as that mentioned above, which is mounted on said follower aircraft.

Furthermore, in a particular embodiment, said device moreover comprises:
  a fifth positioning element which is mounted on the main lead aircraft and which measures the effective (geographic) position of said main lead aircraft; and
  a first data sending element which is mounted on the main lead aircraft and which transmits said effective (geographic) position measured by said fifth positioning element so that it can be received by said first data reception element mounted on the follower aircraft, said first data sending element and said first data reception element forming a first data transmission system.

Additionally, in a particular variant embodiment, said system also comprises:
  a sixth positioning element which is mounted on the auxiliary lead aircraft and which measures the effective (geographic) position of said auxiliary lead aircraft; and
  a second data sending element which is mounted on the auxiliary lead aircraft and which transmits said effective (geographic) position measured by said sixth positioning element so that it can be received by said second data reception element mounted on the follower aircraft, said second data sending element and said second data reception element forming a second data transmission system.

Of course, said system in accordance with the invention may be intended for a patrol flight comprising, in addition to said main and auxiliary lead aircraft, a plurality of follower aircraft. In this case, advantageously, each of said follower aircraft is equipped with a device such as that mentioned above.

BRIEF DESCRIPTION OF THE DRAWING

The figures of the appended drawing will elucidate the manner in which the invention may be embodied. In these figures, identical references designate similar elements.

DESCRIPTION OF THE PREFERRED EMBODIMENTS

Figure 1:
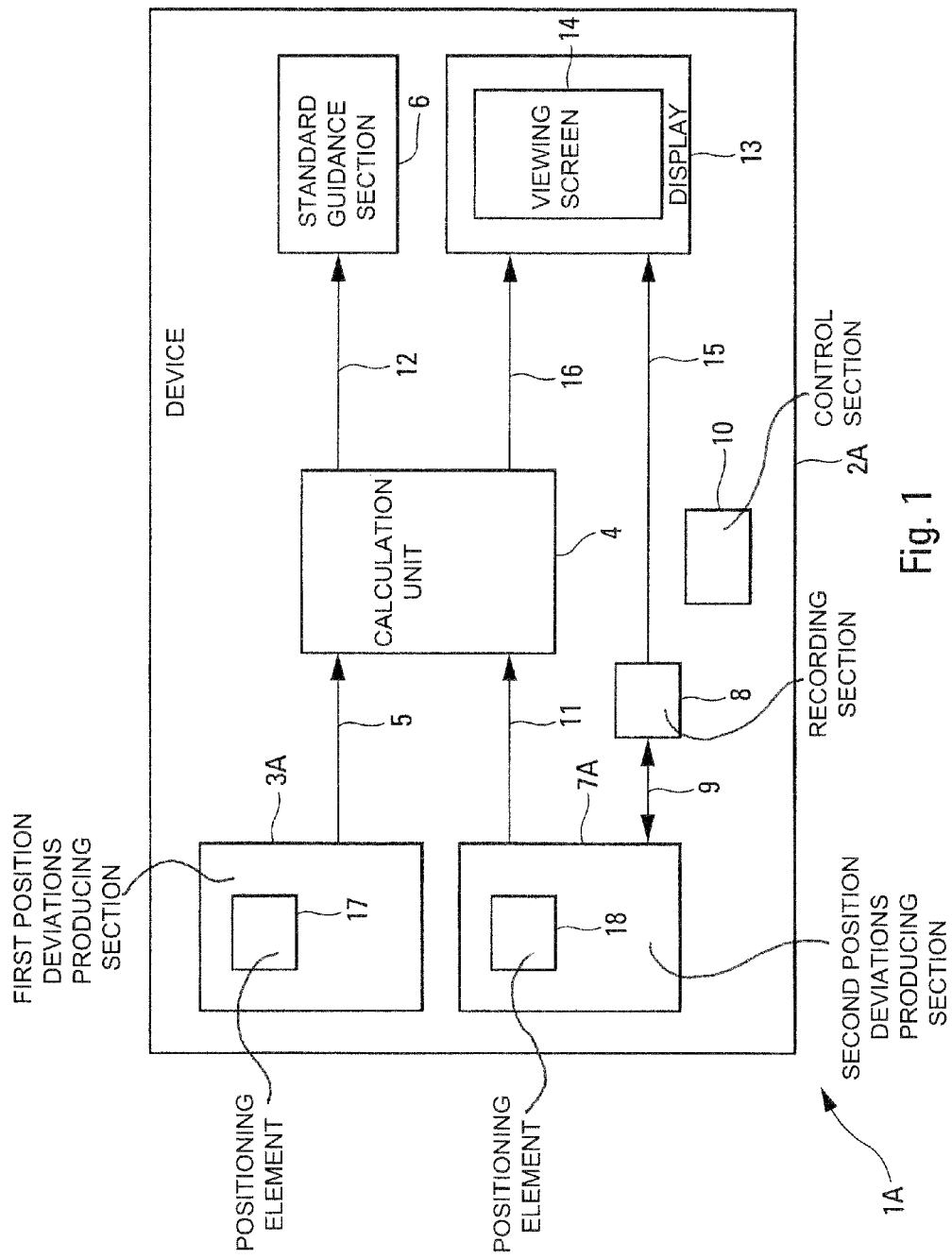
FIGS. 1 and 2 are the schematic diagrams of two different embodiments of a system for aiding a patrol flight, in accordance with the invention.
Figure 2:
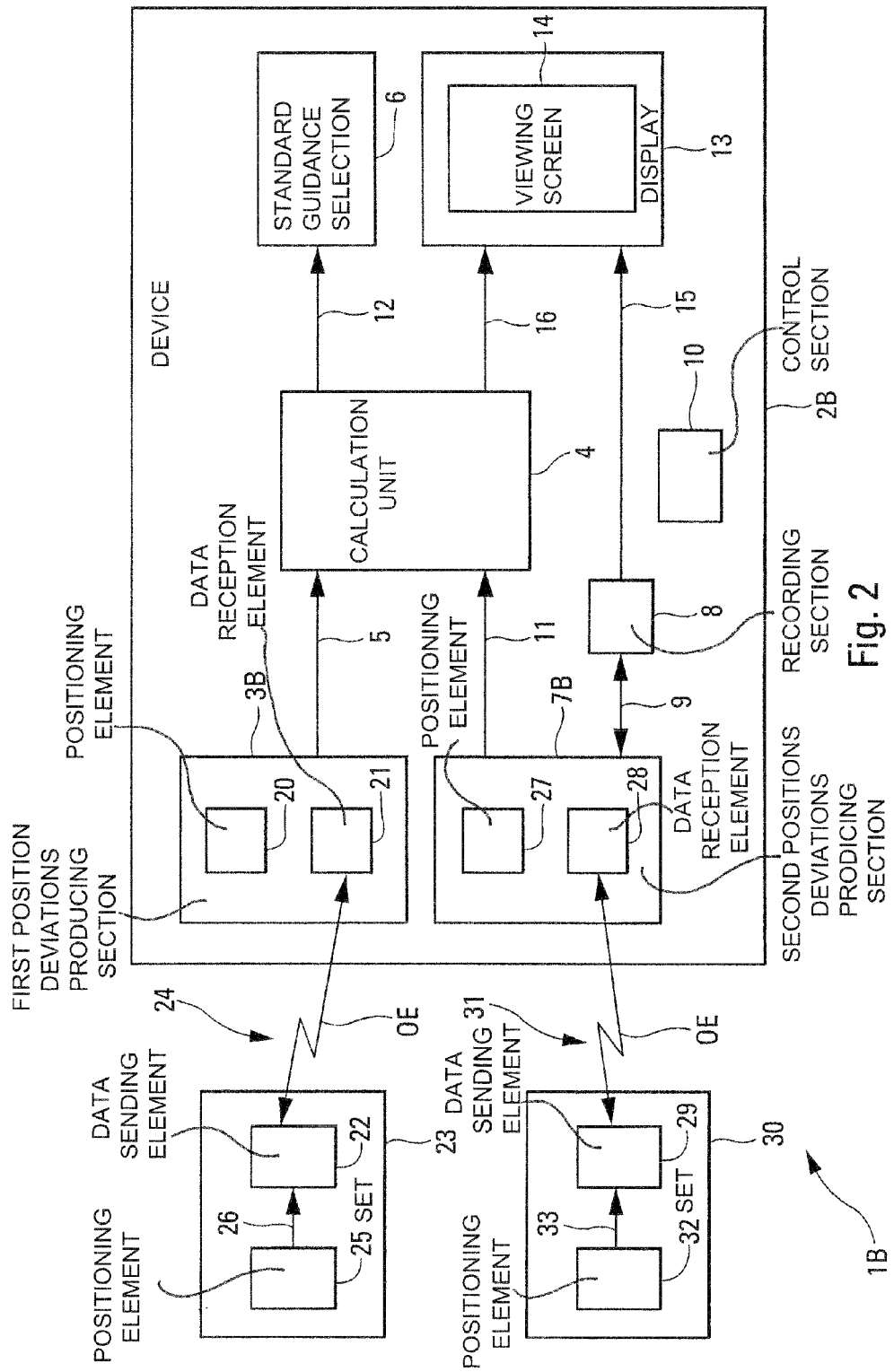

The system 1A, 1B in accordance with the invention and represented diagrammatically in FIGS. 1 and 2 is intended to afford an aid to patrol flight. The patrol (or formation) taken into account comprises a main lead aircraft (or main leader) A1 and a plurality of follower aircraft (or wingmen) A2, A3 and A4 which follow said main lead aircraft A1 in flight according to a particular spacing (defined vertically, longitudinally and laterally) in accordance with a predetermined main patrol configuration. These aircraft A1 to A4 may, for example, be military transporters or fighters, flying in patrol.

According to the invention, said system 1A, 1B comprises at least one device 2A, 2B which is mounted on at least one of said follower aircraft A2, A3, A4. Of course, preferably, each of said follower aircraft A2 to A4 is equipped with such a device 2A, 2B.

Figure 3:
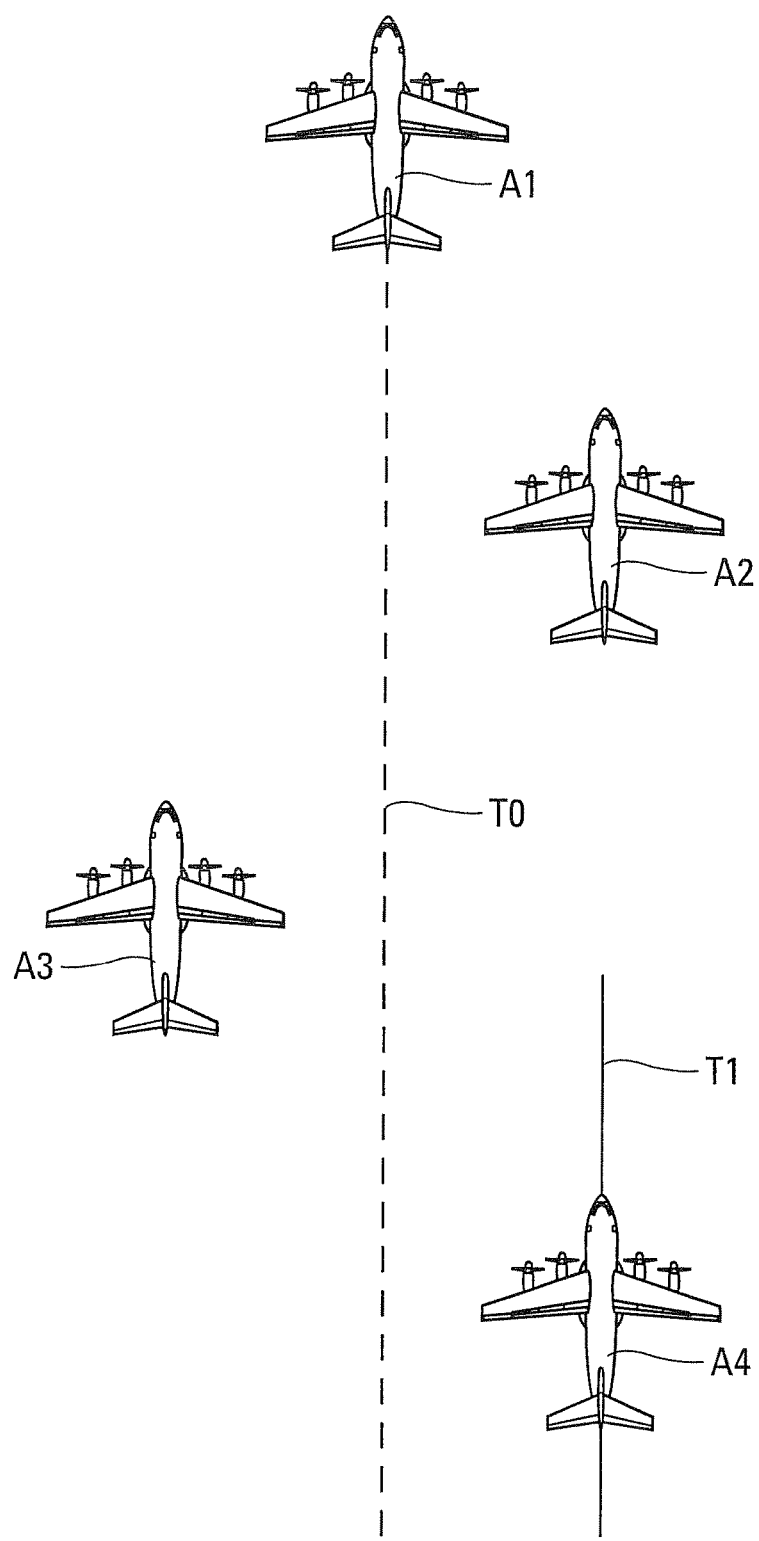
FIG. 3 diagrammatically illustrates an exemplary patrol flight implemented by virtue of a system for aiding a patrol flight, in accordance with the invention.

Said device 2A, 2B is of the type comprising:

means 3A, 3B for producing first position deviations between the follower aircraft considered and said main lead aircraft A1. By way of example, the aircraft A4 is taken into account as follower aircraft in the following description, of course the description would be similar for another follower aircraft A2 or A3 for example;

a calculation unit 4 which is connected by way of a link 5 to said means 3A, 3B and which is formed in such a way as to determine, as a function of said predetermined main patrol configuration and of first position deviations received from said means 3A, 3B, a trajectory T1 which corresponds to a flight trajectory allowing the follower aircraft A4 to follow said main lead aircraft A1 (which flies along a trajectory T0 represented dashed in FIG. 3) in accordance with said main patrol configuration; and standard guidance means 6, which are connected by way of a link 12 to said calculation unit 4, which receive the trajectory T1 determined by this calculation unit 4, and which are formed in such a way as to aid the guidance of the follower aircraft A4 along said trajectory T1 received.

Furthermore, according to the invention:

said device 2A, 2B moreover comprises:

means 7A, 7B which are able to produce second position deviations between the follower aircraft A4 and a predetermined auxiliary lead aircraft. In the description hereinbelow, it is considered that the aircraft A2 corresponds to this auxiliary lead aircraft. It could also be an aircraft other than the aircraft A1 and A4, for example the aircraft A3;

recording means 8 which are connected by way of a double link 9 to said means 7A, 7B and which are formed in such a way as to continuously record said second position deviations determined by said means 7A, 7B, as well as the trajectory of said auxiliary lead aircraft A2; and a control means 10 which is able to be actuated by a pilot of the follower aircraft A4 and which is formed in such a way as to control the transmission of said second position deviations determined by said means 7A, 7B to said calculation unit 4 via a link 11, when said control means is actuated; and said calculation unit 4 is formed in such a way as:

to calculate, upon actuation of said actuation means 10, as a function of the second position deviations received from said means 7A, 7B by way of the link 11, as well as of an auxiliary patrol configuration and of said trajectory of said auxiliary lead aircraft A2, a trajectory T2 which corresponds to a flight trajectory allowing the follower aircraft A4 to follow the auxiliary lead aircraft A2 in accordance with said auxiliary configuration; and to transmit this trajectory T2 to said guidance means 6 by way of the link 12, and to do so in place of said trajectory T1, so that the guidance means 6 then aid in guiding the follower aircraft A4 along said trajectory T2 received.

Thus, by virtue of the invention, an auxiliary lead aircraft A2 (or replacement leader) is envisaged in advance (generally during mission preparation), which is intended to replace the main lead aircraft A1 (or main leader) if this turns out to be necessary. For reasons of simplification of the implementation of a possible replacement, the auxiliary lead aircraft A2 is in general (but not exclusively) the aircraft which immediately follows the main lead aircraft A1 in the main patrol configuration.

Moreover, by virtue of the invention, a leader replacement is implemented automatically upon the actuation of said control means 10 by the pilot of the follower aircraft A4. So, upon the disappearance of the current leader (main lead aircraft A1), the pilot of the follower aircraft A4 can actuate said control means 10 so that the device 2A, 2B in accordance with the invention then takes into account the position of the replacement leader (auxiliary lead aircraft A2) which is henceforth followed by the follower aircraft A4 in accordance with the predetermined auxiliary patrol configuration. The above characteristics are of course implemented on all the follower aircraft A3, A4 of the patrol, which then all follow the auxiliary lead aircraft A2.

Consequently, within the framework of the present invention, a patrol configuration (or formation configuration is defined with respect to the current leader and a patrol configuration (or formation configuration) is defined with respect to the replacement leader, and said device 2A, 2B is able to take into account the latter configuration as current configuration at any moment, simply on a decision of to pilot of to follower aircraft A4 (without this pilot being compelled to carry out an in-depth analysis of the situation ensuing from the disappearance of to main leader, which is often tricky). The expression "patrol configuration" is understood to mean the position and the deviations (lateral, longitudinal, vertical) within the patrol, between the one or more follower aircraft and the current leader of the patrol.

Additionally, as the device 2A, 2B in accordance with the invention records continuously, by way of said recording means 8, said second position deviations (that is to say the longitudinal, lateral and vertical deviations with respect to the auxiliary lead aircraft A2), the values used by the calculation unit 4 upon actuation of the control means 10 represent the current actual deviations, thereby eliminating any risk of deviation of the follower aircraft A4 for attaining its new reference position in the formation and avoiding the need for the auxiliary lead aircraft A2 to have to attain prior to replacement the position occupied by the main lead aircraft A1 before its disappearance. Thus, the auxiliary lead aircraft A2 can keep its position during the replacement of the leader, and the follower aircraft A3, A4 all position themselves with respect to this position, in accordance with the predetermined auxiliary patrol configuration.

Consequently, the device 2A, 2B in accordance with the invention aids in anticipating a disappearance of the main lead aircraft A1, that is to say of the current leader.

It will be noted that the guidance means 6 of the device 2A, 2B in accordance with the invention may comprise integrated means, such as a flight director for example, which are intended to give the pilot of the follower aircraft A4 indications in such a way as to allow him to manually make the latter follow the trajectory T1, T2 received from the calculation unit 4. However, in a preferred embodiment, said guidance means 6 comprise integrated automatic piloting means which automatically (in standard fashion) carry out the guidance of the follower aircraft A4 along the trajectory T1, T2 received. In this case, the pilot of the follower aircraft A4 can devote himself entirely (and in complete safety) to other tasks, such as the observation of his aerial environment or of the terrain overflown for example.

In a particular embodiment, said device 2A, 2B moreover comprises display means 13 which are able to present, on at least one viewing screen 14, values illustrating said second position deviations recorded by said recording means 8 and received by way of a link 15. Thus, the pilot of the follower aircraft A4 can be aware of the relative position between his aircraft A4 and the replacement leader (auxiliary lead aircraft A2) although the latter is not yet considered to be the current leader.

Moreover, in a particular embodiment, said display means 13 are formed in such a way as also to present on the viewing screen 14 values illustrating said first position deviations with respect to the current leader (main lead aircraft A1 or auxiliary aircraft A2 according to the situation). These position deviations may be received, by way of a link 16, from the means 3A, 3B or 7A, 7B, either directly, or via said calculation unit 4.

In a first embodiment 2A of the device in accordance with the invention, represented in FIG. 1:

said means 3A comprise a positioning element 17 which measures the relative positioning between the main lead aircraft A1 and the follower aircraft A4 in such a way as to produce said first position deviations directly; and said means 7A comprise a positioning element 18 which measures the relative positioning between the auxiliary lead aircraft A2 and the follower aircraft A4 in such a way as to produce said second position deviations directly.

Said positioning elements 17 and 18 may correspond to one and the same positioning element, thereby making it possible to simplify the device 2A in accordance with the invention.

Preferably, each of said positioning elements 17, 18 is formed in such a way as to measure the azimuth and the distance with respect to the lead aircraft A1, A2 taken into account, and comprises, moreover, a standard clock making it possible to date the measurements carried out.

Additionally, in a second embodiment 2B of the device in accordance with the invention, represented in FIG. 2, said means 3B comprise:

a positioning element 20, for example a standard GPS receiver, which measures the effective absolute position of the follower aircraft A4; and a data reception element 21 which is formed in such a way as to receive the effective absolute position of the main lead aircraft A1, said effective absolute positions of said follower aircraft A4 and of said main lead aircraft A1 making it possible to form said first position deviations.

This data reception element 21 cooperates with a data sending element 22 which forms part of a set 23 which is mounted on the main lead aircraft A1. Said data sending element 22 and said data reception element 21 form a data transmission system 24, transmitting for example data in the form of electromagnetic waves OE. Said set 23 comprises, moreover, a positioning element 25, which is for example similar to the positioning element 20, and which is formed in such a way as to measure the effective absolute position of said main lead aircraft A1 and to transmit it by way of a link 26 to said data sending element 22.

Additionally, in this second embodiment 2B of the device in accordance with the invention, represented in FIG. 2, said means 7B comprise:

a positioning element 27, for example a GPS receiver, which measures the effective absolute position of the follower aircraft A4. This positioning element 27 may correspond to the positioning element 20; and a data reception element 28 which is formed in such a way as to receive the effective absolute position of the auxiliary lead aircraft A2, said effective absolute positions of said follower aircraft A4 and of said auxiliary lead aircraft A2 making it possible to form said second position deviations.

This data reception element 28 cooperates with a data sending element 29 which forms part of a set 30 which is mounted on the auxiliary lead aircraft A2. Said data sending element 29 and said data reception element 28 form a data transmission system 31, transmitting data preferably in the form of electromagnetic waves OE. Said set 30 comprises, moreover, a positioning element 32, which is for example similar to the positioning element 27, and which is formed in such a way as to measure the effective absolute position of said auxiliary lead aircraft A2 and to transmit it by way of a link 33 to said data sending element 29.

Of course, within the framework of the present invention, a device in accordance with the invention may also comprise:
simultaneously means 3A and means 7B; or
simultaneously means 3B and means 7A.

The invention claimed is:

1. A device for aiding the guidance of a follower aircraft, said device which is mounted on said follower aircraft and which allows said follower aircraft to follow a main lead aircraft during a patrol flight, comprising:

first means for producing first position deviations between the follower aircraft and the main lead aircraft;

a calculation unit for determining, as a function of a predetermined main patrol configuration and of said first position deviations, a first trajectory which corresponds to a flight trajectory allowing the follower aircraft to follow said main lead aircraft in accordance with said main patrol configuration; and guidance means which receive the trajectory determined by said calculation unit and which are formed to aid the guidance of the follower aircraft along said trajectory received, wherein said device moreover comprises:

second means for producing second position deviations between the follower aircraft and a predetermined auxiliary lead aircraft;

recording means for recording said second position deviations and another trajectory corresponding to said auxiliary lead aircraft; and a control device for directing the transmission of said second position deviations to said calculation unit when said control device is actuated by a pilot of said follower aircraft; and wherein said calculation unit is formed:

to calculate as a function of said second position deviations received, of said another trajectory corresponding to said auxiliary lead aircraft and of an auxiliary patrol configuration, a second trajectory which corresponds to a flight trajectory allowing the follower aircraft to follow the auxiliary lead aircraft in accordance with said auxiliary patrol configuration; and to transmit this second trajectory to said guidance means, in place of said first trajectory.

2. The device as claimed in claim 1, wherein said first means comprise a first positioning element which measures the relative positioning between the main lead aircraft and the follower aircraft to produce said first position deviations directly.

3. The device as claimed in claim 1, wherein said first means comprise:

a second positioning element which measures the effective position of the follower aircraft; and a first element for receiving data which is formed to receive the effective position of the main lead aircraft, said effective positions of said follower aircraft and of said main lead aircraft making it possible to form said first position deviations.

4. The device as claimed in claim 1, wherein said second means comprise a third positioning element which measures the relative positioning between the auxiliary lead aircraft and the follower aircraft to produce said second position deviations directly.

5. The device as claimed in claim 1, wherein said second means comprise:
- a fourth positioning element which measures the effective position of the follower aircraft; and
- a second element for receiving data which is formed to receive the effective position of the auxiliary lead aircraft, said effective positions of said follower aircraft and of said auxiliary lead aircraft making it possible to form said second position deviations.

6. The device as claimed in claim 1, which moreover comprises display means able to present, on at least one viewing screen, values illustrating said second position deviations recorded.

7. The device as claimed in claim 6, wherein said display means are formed likewise to present on said viewing screen values illustrating said first position deviations.

8. A system for aiding a patrol flight, said patrol comprising a main lead aircraft, an auxiliary lead aircraft and at least one follower aircraft, which comprises at least one guidance aiding device as specified under claim 1, which is mounted on said follower aircraft.

9. The system as claimed in claim 8, wherein said first means of said guidance aiding device comprises a second positioning element which measures the effective position of the follower aircraft, and a first element for receiving data which is formed to receive the effective position of the main lead aircraft, said effective positions of said follower aircraft and of said main lead aircraft making it possible to form said first position deviations, and wherein said system further comprises:
- a fifth positioning element which is mounted on the main lead aircraft and which measures the effective position of said main lead aircraft; and
- a first data sending element which is mounted on the main lead aircraft and which transmits said effective position measured by said fifth positioning element so that it can be received by a first data reception element mounted on the follower aircraft said first data sending element and said first data reception element forming a first data transmission system.

10. The system as claimed in claim 8, wherein said second means of said guidance aiding device comprises a fourth positioning element which measures the effective position of the follower aircraft, and a second element for receiving data which is formed to receive the effective position of the auxiliary lead aircraft, said effective positions of said follower aircraft and of said auxiliary lead aircraft making it possible to form said second position deviations, and wherein said system further comprises;
- a sixth positioning element which is mounted on the auxiliary lead aircraft and which measures the effective position of said auxiliary lead aircraft; and
- a second data sending element which is mounted on the auxiliary lead aircraft and which transmits said effective position measured by said sixth positioning element so that it can be received by said second data reception element mounted on the follower aircraft, said second data sending element and said second data reception element forming a second data transmission system.

11. The system as claimed in claim 8, for an aid to a patrol flight, said patrol comprising, in addition to said main and auxiliary lead aircraft, a plurality of follower aircraft, said system comprising a plurality of said guidance aiding devices, each of said follower aircraft being equipped with one of said guidance aiding devices.

12. An aircraft, which comprises at least one device specified under claim 1.

* * * * *